United States Patent [19]

Pearson

[11] 4,389,716
[45] Jun. 21, 1983

[54] MODE CONTROL SYSTEM FOR A RADIO/TAPE PLAYER UNIT

[75] Inventor: Erik W. Pearson, Canoga Park, Calif.

[73] Assignee: Superscope, Inc., Chatsworth, Calif.

[21] Appl. No.: 257,168

[22] Filed: Apr. 24, 1981

[51] Int. Cl.³ .......................... H04B 1/20; H04B 1/06
[52] U.S. Cl. ........................................ 369/6; 455/344; 455/345
[58] Field of Search .................. 369/6, 10, 11; 360/69, 360/61, 137; 455/344, 345

[56] References Cited

U.S. PATENT DOCUMENTS

| | | | |
|---|---|---|---|
| 3,385,534 | 7/1966 | Staar | 242/55.13 |
| 3,400,227 | 9/1968 | Lear et al. | 369/10 |
| 3,531,127 | 9/1970 | Harper | 369/11 X |
| 3,821,489 | 6/1974 | Kocubej | 369/10 |
| 4,147,898 | 4/1979 | Tozune et al. | 369/10 X |
| 4,149,043 | 4/1979 | Itoh et al. | 369/10 |

Primary Examiner—Aristotelis M. Psitos
Attorney, Agent, or Firm—Fulwider, Patton, Rieber, Lee & Utecht

[57] ABSTRACT

A system is provided for controlling the mode of operation of a combination radio/tape player unit, particularly of the type commonly installed in vehicles and including a mode control switch for automatically switching the unit from a "radio" mode to a "tape" mode upon insertion of a tape cassette or the like into the unit. The mode control system comprises a mode override switch responsive to operation of the unit in a fast-forward or reverse condition for rapid advancing or rewinding of recording tape to return the unit to the "radio" mode for the duration of the fast-forward or rewind operation.

16 Claims, 8 Drawing Figures

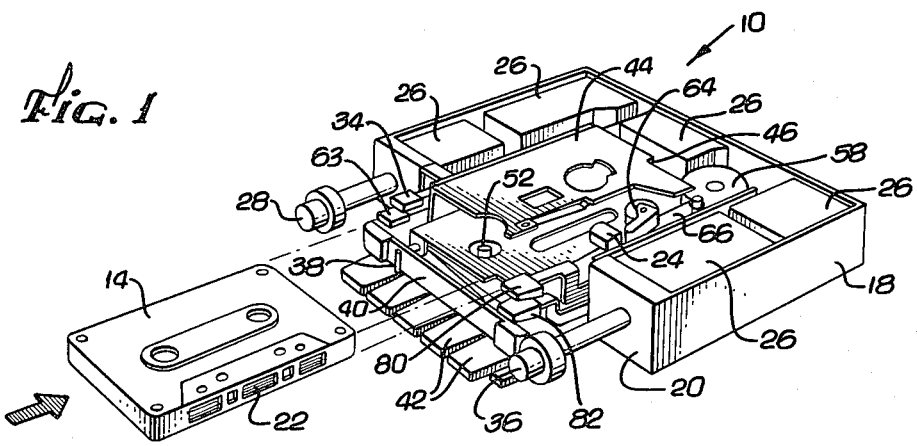

MODE CONTROL SYSTEM FOR A RADIO/TAPE PLAYER UNIT

BACKGROUND OF THE INVENTION

This invention relates to a mode control system for a combination radio/tape player unit. More specifically, this invention relates to a relatively simple and inexpensive switching system and circuit therefor for automatic switching of a radio/tape player unit between a "radio" mode and a "tape" mode.

Combination radio/tape player units in general are known in the art. Such units commonly include appropriate electronic components for receiving and amplifying a broadcast radio signal having a selected frequency and for converting this received signal to an audio output played over one or more speakers. The unit also includes appropriate mechanical apparatus for receiving a supply of magnetic recording tape, typically carried in a cassette or eight-track housing or the like, and for transporting the recording tape past a magnetic pick-up head which converts information stored on the tape to electronic signals for amplification and playback as an audio output over the speakers. The radio/tape player unit includes a so-called mode selector switch operable to select the desired mode of operation of the unit, namely, a "radio" mode wherein the radio signal is played over the speakers or a "tape" mode wherein the information from the tape is played over the speakers.

When the radio/tape player unit is designed and constructed for use in a home environment or the like, the mode selector switch commonly comprises a manually operated switch located on the face of the unit. The mode of operation of the unit is thus easily selected according to the desires of the individual merely by adjustment of the position of the switch. When the tape player portion of the unit is operated in a fast-forward or reverse condition to rapidly advance or rewind the tape, an uninterrupted audio output can be maintained by manually returning the mode selector switch to a "radio" mode position.

However, a large number of radio/tape player units are designed and constructed in compact form for installation in vehicles. In these compact units, the mode selector switch is normally mounted inside the unit in a position for automatic movement from a "radio" mode setting to a "tape" mode setting whenever a cassette or similar tape-carrying housing is inserted into the unit. Similarly, the mode selector switch is automatically returned to the "radio" mode setting whenever the cassette is removed from the unit. In this manner, mode selection is automatic thereby enabling the driver of the vehicle to operate the radio/tape player unit without diverting his vision from the road to search for and adjust switches on the unit.

In operation of the radio/tape player unit, it is periodically necessary to operate the tape player portion of the unit in a fast-forward or reverse condition to rapidly advance or rewind the recording tape. In units designed for vehicles, however, the use of an automatic mode selector switch prohibits operation of the unit in a "radio" mode during the fast-forward or reverse operating condition, since the mode selector switch is not accessible for manual adjustment. Accordingly, in radio/tape player units of this type, an audio output is not possible for the duration of the fast-forward or reverse condition which, with modern cassettes carrying relatively long lengths of recording tape, can continue for a period of a few minutes.

It is desirable, therefore, to provide a mode control system in a radio/tape player unit particularly of the type for installation in a vehicle, wherein the system automatically switches the unit between "radio" and "tape" modes in response to insertion of a cassette or the like into the unit and wherein the system automatically returns the unit to a "radio" mode whenever the tape player portion of the unit is operated in a fast-forward of reverse condition. The present invention fulfulls this need.

SUMMARY OF THE INVENTION

In accordance with the invention, a mode control system for a radio/tape player unit is provided for automatic switching of the unit from a "tape" mode to a "radio" mode whenever the tape player portion of the unit is operated in a fast-forward or reverse condition. The mode control system is particularly designed for use in a radio/tape player unit for installation in a vehicle and including a mode selector switch for switching the unit automatically between "radio" and "tape" modes in response to insertion of a tape cassette or the like into the unit. The mode control system operates in conjunction with the mode selector switch to override the mode selector switch when the tape player portion of the unit is operated in the fast-forward or reverse condition.

According to one preferred embodiment of the invention, the radio/tape player unit is adapted to receive a tape cassette or the like which, when inserted into the unit, moves the mode selector switch from a "radio" mode setting to a "tape" mode setting. At the same time, a magnetic pick-up head is moved into operative association with recording tape within the cassette, and the recording tape is driven or transported past the head. Removal of the cassette from the unit allows the mode selector switch to return to the "radio" mode setting.

The mode selector switch operates, in the "radio" mode setting, to couple electrical power to appropriate radio receiver components for receiving a selected broadcast radio signal and for supplying the signal to a main amplifier and in turn to one or more speakers which provide the audio output. In the "tape" mode setting, the mode selector switch uncouples the electrical power from the radio receiver components and couples the power instead to appropriate tape player pick-up, amplification, and tape drive components which supply suitable electronic signals to the main amplifier and in turn to the unit speakers.

A mode override switch is coupled electrically between the mode selector switch and the tape player pick-up and amplification components to disconnect these components from electrical power whenever the tape player portion of the unit is operated in a fast-forward or reverse condition and to thereupon couple the electrical power to the radio receiver components of the unit. This mode override switch is mechanically operated in response to the positions of fast-forward and reverse selector switches conventionally provided with the unit. In this manner, whenever the tape player portion of the unit is operated in the fast-forward or reverse condition, the mode override switch automatically returns the unit to a "radio" mode even though the mode selector switch remains in the "tape" mode setting.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a radio/tape player unit embodying the novel features of this invention and illustrating insertion of a tape cassette thereinto;

FIG. 2 is an enlarged fragmented top plan view illustrating initial movement of the tape cassette into the unit;

FIG. 3 is an enlarged fragmented vertical section taken generally on the line 3—3 of FIG. 2 and illustrating a mode selector switch in a "radio" mode setting;

FIG. 5 is an enlarged fragmented vertical section taken generally on the line 5—5 of FIG. 3 and illustrating movement of the mode selector switch to a "tape" mode setting;

DETAILED DESCRIPTION OF THE PREFERRED EMBODIMENT

Figure 4:
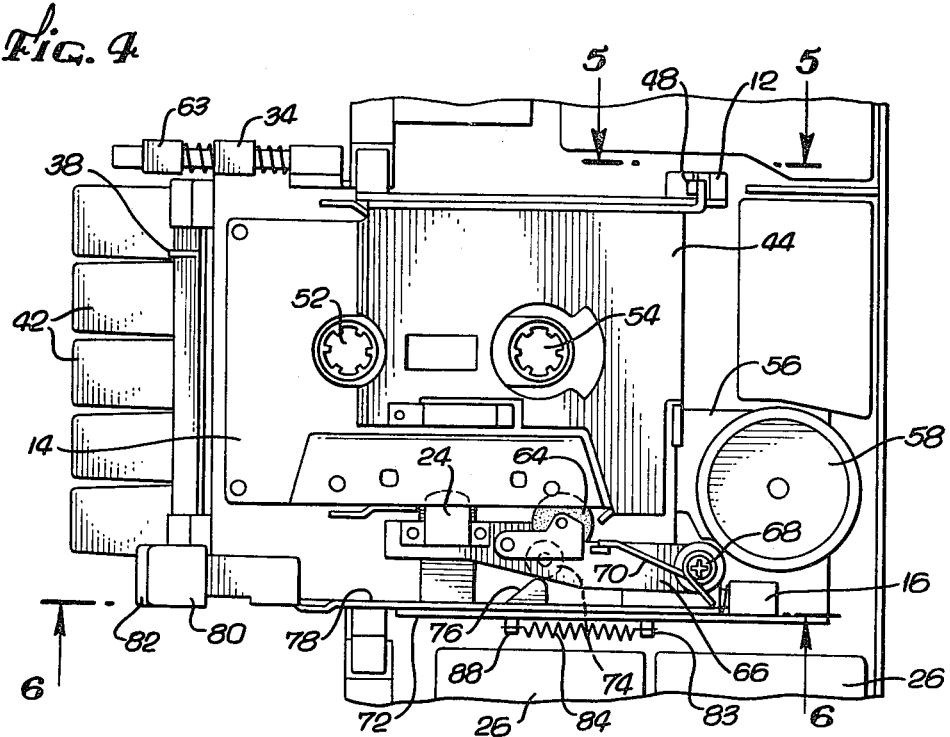
FIG. 4 is an enlarged fragmented top plan view similar to FIG. 2 and illustrating the fully inserted position of a tape cassette within the unit.

A radio/tape player unit embodying the novel features of this invention is illustrated in FIGS. 1–7 and is indicated by the reference numeral 10. The unit 10 is designed to have a relatively compact size and shape for convenient installation into the dashboard of a vehicle (not shown). The unit is connected in a suitable manner to one or more audio speakers (also not shown) to provide a selected audio output depending upon the mode of operation of the unit, as will be described.

According to the invention, the radio/tape player unit 10 includes switching apparatus for automatically switching the operative mode of the unit between a "radio" mode and a "tape" mode in a manner to maximize the time during which an audio output is played by the speakers, thereby providing maximum listening pleasure. More specifically, the unit 10 includes a mode selector switch 12 (FIGS. 3–4) which operates automatically in response to insertion into the unit of a tape-carrying housing such as a cassette 14 for movement from a first or "radio" mode setting to a second or "tape" mode setting. A mode override switch 16 (FIGS. 2, 4, 6, and 7) operates whenever a cassette 14 is inserted into the unit and the tape player portion of the unit is operated in a fast-forward or reverse condition to override the mode selector switch 12 and return the unit to a "radio" mode for the duration of the fast-forward or reverse condition.

The general construction and operation of the basic radio and tape player components of the radio/tape player unit 10 is well understood by those skilled in the art. However, for purposes of illustration and for completeness of understanding of the mode control system of this invention, one exemplary unit construction and operation thereof is disclosed and described herein.

The radio/tape player unit 10 includes a relatively compact, generally box-shaped housing 18 sized for installation into the dashboard of a vehicle, and illustrated with the top of the housing removed to show internal components of the unit. The housing 18 has a front face 20 upon which are mounted a variety of unit controls for easy operation of a radio portion and a tape portion of the unit. Of course, when the unit is operated in a "radio" mode, a broadcast radio signal of selected frequency is received and amplified by appropriate radio receiver components of the unit which supply electronic signals to the speakers (not shown in FIGS. 1–7) to provide a radio audio output. Similarly, when the unit is operated in a "tape" mode, magnetic recording tape 22 in the cassette 14 is transported past a magnetic pick-up head 24 which converts the recorded information on the tape to electronic signals for amplification and supply to the speakers to play back the information as the audio output. Conveniently, since the necessary electronic components for both the radio and tape player portions of the unit are conventional in form, these electronic components are illustrated in FIGS. 1–7 in block form and are designated generally by the reference numeral 26.

The unit 10 includes an on-off and volume control 28, illustrated in dial form in FIG. 1, which is manually operated to couple electrical power from a power source such as from a vehicle storage battery to the mode selector switch 12. This mode selector switch comprises a mechanical lever movable about a pivot pin 30 with respect to an internal wall 28 within the unit and normally biased by a spring 32 toward a forwardly angled position, as illustrated in FIG. 3, whenever the tape cassette 14 is not inserted into the unit. In this position, the mode selector switch 12 couples the electrical power to the radio receiver components to place the unit in the "radio" mode for reception and playing a selected broadcast radio signal.

In many radio/tape player units, the radio portion of the unit desirably includes means for receiving and playing either an AM or an FM radio signal, and in some instances an FM stereo radio signal. In this regard, the mode selector switch typically couples the electrical power to an AM/FM selector button 34 accessible from the front face 2 of the unit. This AM/FM selector button 34 comprises a two-position switch which can be manually moved between a first position to supply the electrical power to AM radio receiver components and a second position to supply the electrical power to FM radio receiver components which may include stereo decoding capability.

When the unit 10 is operated in the "radio" mode, the particular broadcast radio signal to be received and played can be selected by use of conventional radio tuning apparatus. As illustrated, this tuning apparatus can include a dial-type tuner control 36 rotatable to select the radio station signal to be received as indicated by an indicator 38 movable in front of a frequency scale 40. In addition, a plurality of pushbutton channel selectors 42 can be provided for pushbutton selection of several preselected radio channels. However, since this tuning apparatus is conventional in the art, the specific construction and operation thereof is not shown or described in detail herein.

When it is desired to operate the unit 10 in the "tape" mode, a tape cassette 14 is inserted into the unit through an appropriate opening in the front face 20 of the housing 18. The tape cassette is inserted into a forwardly open carriage 44 which is slidably movable within the housing between a forward position as shown in FIGS. 1 and 2 and a rear position as shown in FIG. 4, with suitable spring means (not shown) being provided for urging the carriage toward said forward position. Importantly, when the tape cassette 14 is inserted into the carriage 44, the cassette impacts a rear wall 46 of the carriage and moves the carriage toward the rear position. When this occurs, a laterally projecting striker arm 48 on the rear extent of the carriage engages and moves the mode selector switch 12 rearwardly to a "tape" mode setting, as viewed in FIG. 5.

Movement of the carriage 44 toward the rear position as viewed in FIG. 4 serves to mechanically move a tape drive assembly 50 and the magnetic pick-up head 24 into operative association with the recording tape 22 in the cassette 14. More specifically, in the embodiment illustrated, a pair of drive spindles 52 and 54 are mounted on a platform 56 below the carriage 44 and are appropriately driven by a tape drive motor 58 which is also mounted on the platform 56. Carriage movement toward the rear position mechanically moves the platform by means of appropriate cams or the like to bring the drive spindles 52 and 54 upwardly into driving engagement with a pair of hubs 60 and 62 about which the tape 22 is wound within the cassette. At the same time, a latching mechanism (not shown), such as a latching solenoid, locks the carriage 44 in the rear position until the cassette 14 is removed from the unit. An ejector switch 63 accessible from the front face 20 of the unit may be depressed to permit such removal by momentarily interrupting electrical current to the latching solenoid or otherwise unlocking the latching mechanism to allow the spring-biased carriage 44 to return to the forward position, all in a well-known manner. While the mechanical components for these movements are not shown and described in detail herein, such components are believed to be well understood in the art, as typefied, for example, by U.S. Pat. No. 3,385,534.

Movement of the carriage 44 to the rear position serves to move the head 24 into engagement with the recording tape 22. That is, the head 24 in addition to a conventional capstan roller 64 are mounted on the pivot arm 66 which is rotatably movable with respect to the carriage 44 about a pivot pin 68. A spring 70 reacts between the pivot arm 66 and an upstanding wall 72 on the carriage to normally bias the pivot arm 66 to move the head 24 and roller 64 away from the cassette. However, when the carriage 44 is moved toward the rear position, a small cam roller 74 on the underside of the pivot arm 66 engages and follows the shape of a cam 76 mounted on an upstanding bracket 78 within the housing 18. As viewed in FIGS. 2 and 4, this engagement between the cam roller 74 and the cam 76 causes the pivot arm 66 to pivot toward the cassette and thereby bring the head 24 and capstan roller 64 into engagement with the tape 22.

In the "tape" mode setting position of the mode selector switch 12, the electrical power is uncoupled from the radio receiver components and is instead coupled to the tape drive motor 58 and to appropriate electronic components of the tape player portion. In this manner, the recording tape 22 is transported past the magnetic pick-up head 24 for pick up of the recorded information on the tape and amplification of the information in the form of electronic signals which are supplied to the speakers for playback as the audio output. Thus, when a cassette 14 is inserted into the unit, the unit is automatically switched from the "radio" mode to the "tape" mode with the tape player portion of the unit operating in a "play" condition. Of course, when the cassette is removed from the unit 10, the carriage 44 returns to its forward position to allow the mode selector switch 12 to return to the "radio" mode setting under the influence of the biasing spring 32.

When the cassette is inserted into the unit, it is sometimes necessary to advance or rewind the recording tape 22 at a relatively high rate of speed. When this occurs, it is common to retract the pick-up head 24 from association with the tape to allow high speed transport of the tape without providing an audio output. According to the present invention, the mode override switch 16 returns the radio/tape player unit 10 to a "radio" mode to permit the listener to hear an audio output from the radio portion of the unit for the duration of such tape advancing or rewinding, thereby preventing time periods when an audio output would otherwise not be possible.

More specifically, the unit includes a fast-forward selector switch 80 and a reverse selector switch 82, both accessible from the front face 20 of the unit. Each selector switch 80 and 82 is electrically coupled to the tape drive motor 58 to cause the drive motor, when the switch is depressed, to drive the spindles 60 and 62 in a manner to rapidly advance or to rapidly rewind the tape 22 past the pick-up head 24. Importantly, these selector switches 80 and 82 are mechanically constrained so that the two switches cannot be depressed simultaneously, and depression of one switch serves first to release the other switch if it had not been previously placed in a depressed position. This mechanical construction is conventional in radio/tape player units and thus is not shown or described in detail herein.

Figure 6:
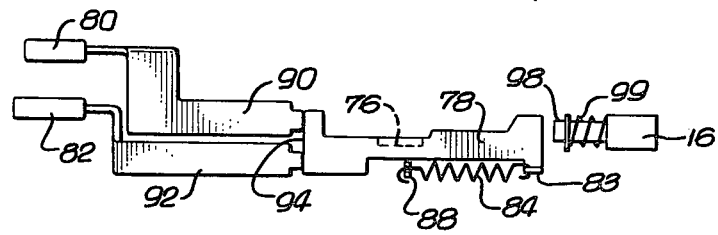
FIG. 6 is a vertical section, somewhat schematic in form, taken generally on the line 6—6 of FIG. 4 and illustrating the operative relationship of a mode override switch with respect to fast-forward and reverse selector switches.
Figure 7:
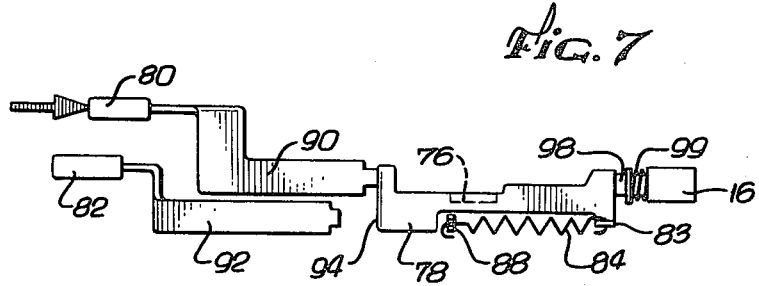
FIG. 7 is a vertical section similar to FIG. 6 illustrating depression of the mode override switch.

The fast-forward and reverse selector switches 80 and 82 are suitably mounted within the unit 10 for sliding movement forwardly and rearwardly, as viewed in FIGS. 6 and 7, and for engagement with the upstanding bracket 78 carrying the cam 76. This bracket 78 is mounted within the unit for sliding motion forwardly and rearwardly with respect to the housing 18. A compression spring 84 is secured between a tab 83 at the rear of the bracket 78 and a second tab 88 (FIGS. 6 and 7) fixed with respect to the housing 18 to urge the bracket to its forwardmost position, as viewed in FIG. 6.

The fast-forward and the reverse selector switches 80 and 82, respectively, include actuator arms 90 and 92 for engaging a front surface 94 of the bracket 78. When either switch 80 or 82 is depressed to its rearward position, as illustrated with respect to the fast-forward switch 80 in FIG. 7, the bracket 78 is linearly shifted to its own rear position. When this occurs, the cam 76 on the bracket 78 is moved rearwardly with respect to the cam roller 74 to enable the cam roller 74 to move down the front face of the cam 76 thereby permitting the pivot arm 66 to pivot the pick-up head 24 and the capstan roller 64 away from the recording tape 22 under the influence of the spring 70. When both the fast-forward and reverse selector switches 80 and 82 are returned to their nondepressed position, as viewed in FIG. 6, the bracket spring 84 returns the bracket to its forward position such that the cam 76 engages the cam roller 74 to once again position the pick-up head 24 and the capstan roller 64 in operative association with the tape 22.

The mode override switch 16 is operated in response to the position of the sliding bracket 78, as governed by the positions of the fast-forward and reverse selector switches 80 and 82. More specifically, the mode override switch 16 is physically positioned at the rear of the bracket 78 and includes a switch housing 96 from which a button 98 biased to a normal nondepressed position by a spring 99 projects forwardly toward the bracket 78. When either one of the fast-forward or reverse selector switches is depressed, the bracket 78 is moved rearwardly into engagement with the button 98 to depress the button and thereby alter the position of the mode override switch 16. This switch 16 is electrically coupled with respect to the mode selector switch 12 to override the mode selector switch and return the unit 10 to the "radio" mode whenever the button 98 is depressed.

Figure 8:
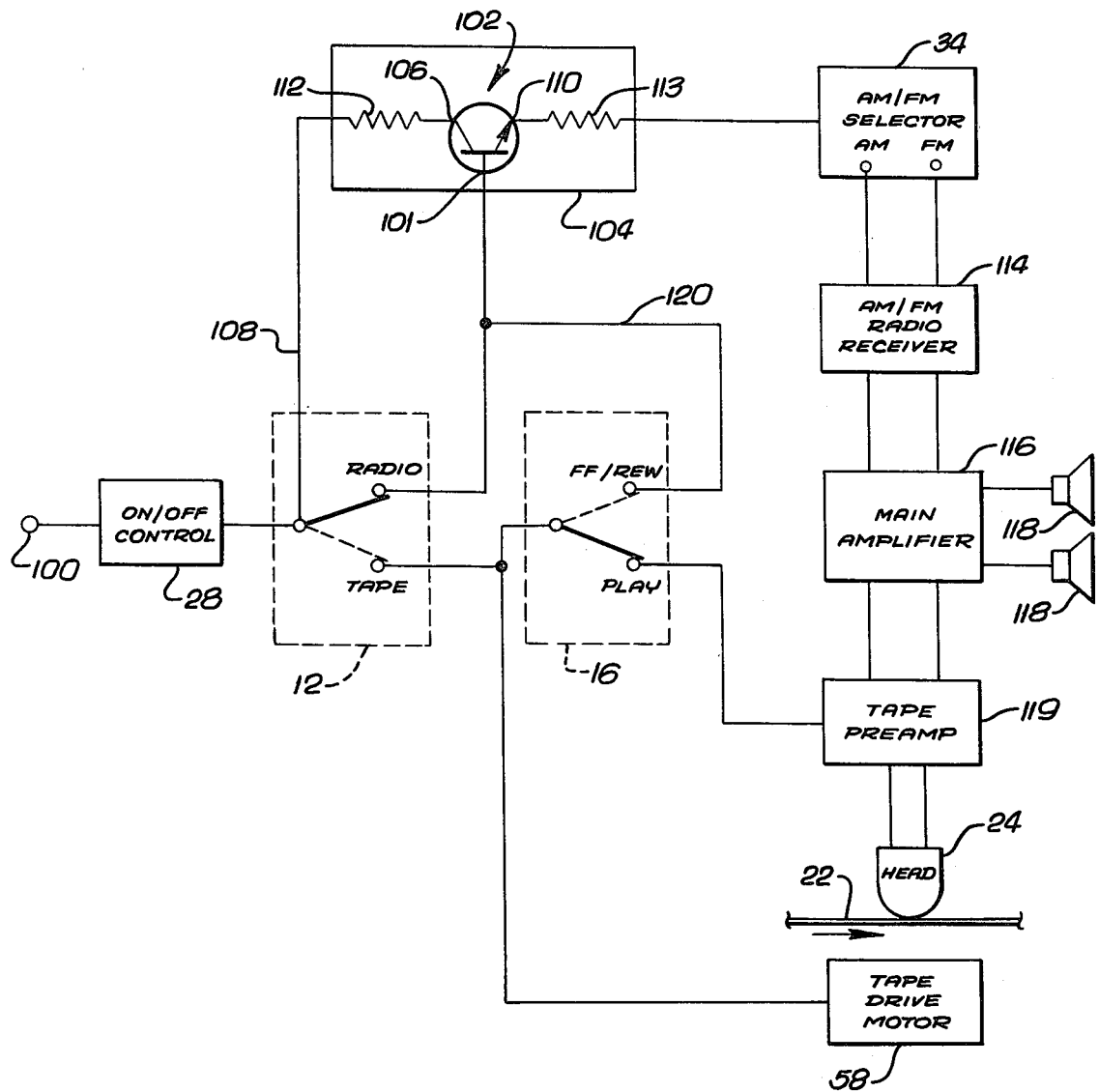
FIG. 8 is a simplified schematic circuit diagram illustrating operation of the mode control system.

FIG. 8 illustrates in schematic form the electrical connections between the mode selector switch 12 and the mode override switch 16. As illustrated, electrical power from a suitable source 100, such as a vehicle storage battery, is coupled through the on-off control 28 to the mode selector switch 12 which is biased to a normal position in a "radio" mode setting as shown in solid lines in FIG. 8. In this position, the mode selector switch couples the power to the base 101 of an npn switching transistor 102 of an electronic switch 104. Electrical power is also supplied to the collector 106 of the transistor 102 by means of a conductor 108 whereby the voltage at the base 101 turns the transistor to an "on" state to couple electrical power to the AM/FM selector switch 34 coupled to the emitter 110 of the transistor. Appropriate biasing resistors 112 and 113 can be provided to control the voltage level supplied to the AM/FM selector switch 34.

The AM/FM selector switch 34 is positioned according to the desires of the listener to supply the electrical power to an AM portion of a radio receiver 114 or to the FM portion of the receiver 114. Depending upon this selection and the particular radio channel chosen by the listener, the receiver 114 provides appropriate electronic signals to a main amplifier 116 which in turn drives one or more speakers 118 to provide the audio output in the "radio" mode.

When the cassette 14 is inserted into the unit 10, the mode selector switch is mechanically moved to the "tape" mode setting, as described above with respect to FIGS. 1–5. As illustrated in FIG. 8, this serves to uncouple the electrical power from the base 101 of the switching transistor 102 thereby switching the transistor to an "off" state and disabling the radio components of the unit. The switch 12 instead connects the electrical power to the mode override switch 16 and to the tape drive motor 58.

The mode override switch 16 is normally in a nondepressed position in a "play" mode setting, as illustrated in solid lines in FIG. 8, to connect the electrical power also to a tape preamplifier 119 which operates the magnetic pick-up head 24 to sense recorded information from the tape 22. The preamplifier provides initial amplification of the information and connects such amplified signals to the main amplifier 116 for further amplification and driving of the speakers 118 to provide the audio output in the "tape" mode.

When either the fast-forward selector switch 80 or the reverse selector switch 82 is depressed, the mode override switch 16 is moved to its depressed or alternate position as illustrated by the dotted lines in FIG. 8. As shown, this movement uncouples electrical power from the tape preamplifier 119 to thus disable the audio output in the "tape" mode as required for the duration of the fast-forward or reverse condition. As the same time, the pick-up head 24 is moved out of association with the tape 22, as described above with respect to FIGS. 4, 6, and 7.

In the fast-forward or the reverse condition, the mode override switch 16 couples the electrical power via a bypass conductor 120 to the base 101 of the switching transistor 102. The switching transistor 102 is thereby returned to the "on" state to once again supply power to the radio components for operation of the unit in the "radio" mode. Accordingly, the mode override switch 16 permits operation of the unit in the "radio" mode whenever the tape player portion is operated in a fast-forward or reverse condition and even though the mode selector switch 12 is in the "tape" mode setting. Upon completion of the fast-forward or reverse condition, the mode override switch returns the power connection to the tape preamplifier 119 to return the unit to the "tape" mode until the cassette is removed from the unit.

The invention thus maximizes the time period during which an audio output can be provided by the unit by automatically returning the unit to a "radio" mode whenever the tape player portion is operated in a fast-forward or reverse condition. This avoids time periods during which an audio output is otherwise not possible, and thereby permits the listener to derive maximum listening pleasure from the radio/tape player unit.

A variety of modifications and improvements to the present invention are believed to be apparent to one skilled in the art. For example, the particular form of the radio/tape player unit and the physical structure and positions of the mode selector and mode override switches can be varied in accordance with the specific form of the unit. Accordingly, no limitation upon the invention is intended, except by way of the appended claims.

What is claimed is:

1. In a radio/tape player unit having a radio portion for receiving and converting a radio signal to an audio output, and a tape player portion having drive means for transporting magnetic tape past sensing means for sensing information stored on the tape and for converting the information to an audio output, a system for controlling the mode of operation of the unit, comprising:

a mode selector switch movable between a "radio" mode setting for energization of the radio portion to provide a radio audio output, and a "tape" mode setting for energization of the tape player portion to provide a tape audio output;

means for selectively operating the tape player portion in a fast-forward condition and in a reverse condition for respective rapid advancing and rewinding of the tape past the sensing means; and a mode override switch responsive to operation of the tape player portion in the fast-forward condition and in the reverse condition to disable the tape audio output and to energize the radio portion to provide a radio audio output.

2. The system of claim 1 wherein the tape player portion includes means for receiving a tape-carrying housing, said mode selector switch being normally biased to the "radio" mode setting and responsive to insertion of said tape-carrying housing into the tape player portion for movement to the "tape" mode setting.

3. The system of claim 2 wherein said sensing means includes a magnetic pick-up head movable into operative association with the tape in response to insertion of said tape-carrying housing into the tape player portion.

4. The system of claim 3 wherein said pick-up head is movable to a position away from operative association with the tape when the tape player portion is operated in the fast-forward condition and in the reverse condition.

5. The system of claim 1 wherein said mode override switch is coupled electrically between said mode selector switch and said sensing means, said mode override switch being movable between a first position for energization of said sensing means to provide a tape audio output and a second position for deenergization of said sensing means and for energization of the radio portion to provide a radio audio output.

6. The system of claim 5 wherein said mode override switch is normally biased to said first position.

7. The system of claim 6 wherein said operating means comprises a fast-forward selector mechanism for controlling, when actuated, operation of said drive means to advance tape at a relatively rapid rate past the sensing means and to move said mode override switch to said second position, and a reverse selector mechanism for controlling, when actuated, operation of said drive means to transport tape in a reverse direction past the sensing means and to move said mode override switch to said second position.

8. The system of claim 1 wherein the unit includes a main amplifier and at least one speaker driven by said amplifier to provide the audio output, said radio portion and said tape player portion sensing means being coupled in parallel between said mode selector switch and said amplifier, said mode override switch being coupled between said mode selector switch and said sensing means.

9. In a radio/tape player unit having a radio portion for receiving and converting a radio signal to an audio output, and a tape player portion having means for receiving a housing carrying magnetic tape and drive means for transporting the tape past sensing means for sensing information stored on the tape and for converting the information to an audio output, a system for controlling the mode of operation of the unit, comprising:
a mode selector switch normally biased to a "radio" mode setting for energization of the radio portion to provide a radio audio output, and movable in response to insertion of the tape-carrying housing into the tape player portion for energization of the drive means and the sensing means to provide a tape audio output;
means for selectively operating the tape player portion in a fast-forward condition and in a reverse condition for respective rapid advancing and rewinding of the tape past the sensing means; and
a mode override switch responsive to operation of the tape player portion in the fast-forward condition and in the reverse condition to disable the tape audio output and to energize the radio portion to provide a radio audio output.

10. The system of claim 9 wherein said mode override switch is coupled electrically between said mode selector switch and said sensing means, said mode override switch being movable between a first position for energization of said sensing means to provide a tape audio output and a second position for deenergization of said sensing means and for energization of the radio portion to provide a radio audio output.

11. The system of claim 10 wherein said mode override switch is normally biased to said first position.

12. The system of claim 11 wherein said operating means comprises a fast-forward selector mechanism for controlling, when actuated, operation of said drive means to advance tape at a relatively rapid rate past the sensing means and to move said mode override switch to said second position, and a reverse selector mechanism for controlling, when actuated, operation of said drive means to transport tape in a reverse direction past the sensing means and to move said mode override switch to said second position.

13. In a radio/tape player unit having a radio portion for receiving and converting a radio signal to an audio output, a tape player portion having means for receiving a housing carrying magnetic tape and drive means for transporting the tape past sensing means for sensing information stored on the tape and for converting the information to an audio output, a mode selector switch movable between a "radio" mode setting for energization of the radio portion to provide a radio audio output and a "tape" mode setting for energization of the drive means and the sensing means to provide a tape audio output, and a pair of selector mechanisms for respective operation of the drive means in a fast-forward condition for rapid advancing of the tape past the sensing means and in a reverse condition to transport the tape in a reverse direction past the sensing means, the improvement comprising:
a mode override switch responsive to actuation of one of said selector mechanisms to operate the drive means in one of the fast-forward and reverse conditions to disable the tape audio output and to energize the radio portion to provide a radio audio output.

14. The improvement of claim 13 wherein said mode override switch is coupled electrically between said mode selector switch and said sensing means, said mode override switch being movable between a first position for energization of said sensing means to provide a tape audio output and a second position for deenergization of said sensing means and for energization of the radio portion to provide a radio audio output.

15. The improvement of claim 14 wherein said mode override switch is normally biased to said first position.

16. A radio/tape player unit, comprising:
radio means for receiving and converting a radio signal to a radio audio output;
tape player means for sensing information recorded upon magnetic tape and for converting the sensed information to a tape audio output, said tape player means including a magnetic pick-up head for sensing the stored information and drive means for transporting the tape past said pick-up head;
first switch means movable between a "radio" mode setting for energizing said radio means to provide the radio audio output, and a "tape" mode setting for energizing said tape player means to provide the tape audio output;
a pair of selector mechanisms for respective operation of said drive means in a fast-forward condition for rapid advancing of the tape past said head, and in a reverse condition to transport the tape in a reverse direction past said head; and second switch means responsive to said selector mechanisms when said drive means is operated in one of the fast-forward and reverse conditions to override said first switch means and to disable the tape audio output and to energize said radio means to provide the radio audio output.

* * * * *